March 15, 1938.  R. A. GOEPFRICH  2,111,321
BRAKE
Filed Dec. 31, 1936
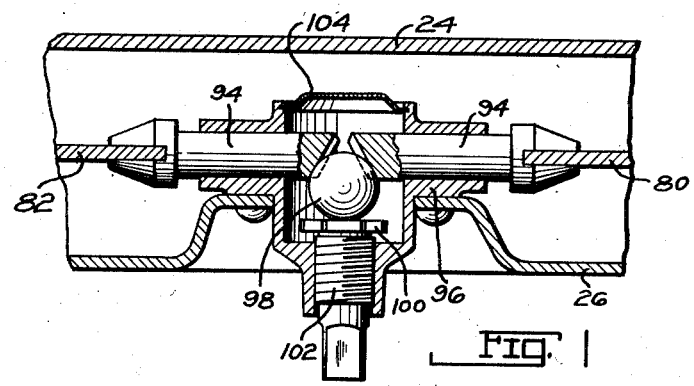
Fig. 1
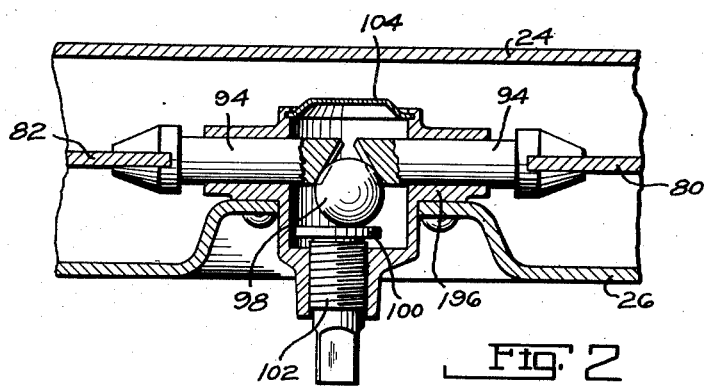
Fig. 2
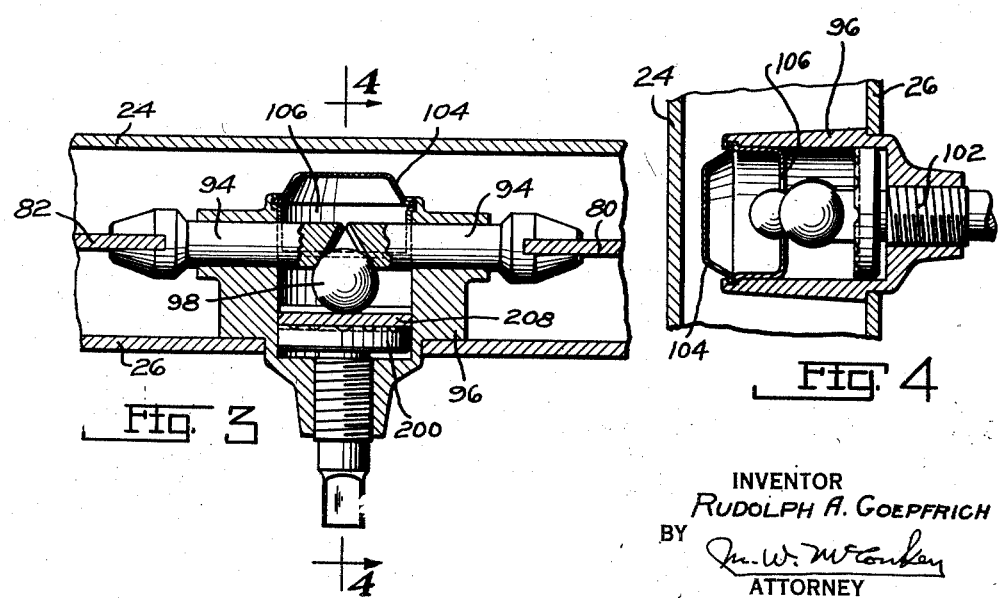
Fig. 3
Fig. 4
INVENTOR
RUDOLPH A. GOEPFRICH
BY
ATTORNEY Patented Mar. 15, 1938

2,111,321

UNITED STATES PATENT OFFICE 2,111,321

BRAKE

Rudolph A. Goepfrich, South Bend, Ind., assignor to Bendix Products Corporation, South Bend, Ind., a corporation of Indiana Application December 31, 1936, Serial No. 118,459

1 Claim. (Cl. 188—79.5)

This invention relates to brakes, and is illustrated as embodied in an internal expanding brake for an automobile.

An object of the invention is to provide a simple and rugged shiftable device connecting the brake shoes, and which is adjustable to spread the shoes apart to compensate for wear of the brake lining. In one desirable arrangement this device includes plungers engaging the shoes and formed with converging faces between which a ball is crowded to wedge the shoes apart. The ball has rolling engagement with a head or the like on a member which is operable to make the desired adjustments.

The above and other objects and features of the invention, including various novel combinations of parts and desirable particular arrangements, will be apparent from the following description of the illustrative embodiments shown in the accompanying drawing, in which:

Figures 1, 2 and 3 are sections through different forms of adjusting and connecting devices, and which illustrate different embodiments of my invention; and Figure 4 is a partial section through the third embodiment, on the line 4—4 of Figure 3.

The novel adjusting and connecting devices are illustrated as embodied in a brake such as is described and illustrated in Patent No. 2,045,010, granted Bendix Aviation Corporation on June 23, 1936, on an application filed by me on December 1, 1932. The present invention may be regarded as an improvement on the brake shown in that patent, although some of its advantages are obtainable in brakes of other types. Where the parts are the same, or are analogous in function, the same reference characters are used herein as in said patent.

As explained in detail in said Patent No. 2,045,010, the brake illustrated includes a drum 24, at the open side of which is a support such as a backing plate 26, and within which are arranged brake shoes 80 and 82, T-shaped in cross-section and faced with suitable brake lining. The brake may be provided with suitable anchorage and applying means, return springs, positioning stops, and steady rests, as described in said patent. The present invention has to do with a novel floating adjustment connecting the shoes.

The ends of the shoe webs are embraced by slots in the outer ends of alined plungers 94, arranged end to end, and with their inner adjacent ends beveled to form converging wedge surfaces or faces. These plungers are guided by cylindrical passages in opposite sides of a bracket 96, or other type of guide means, secured to the backing plate by suitable fastening means.

The converging wedge faces of the plungers 94 engage between them a hardened ball 98 in rolling thrust engagement in the embodiment of Figures 1 and 2, with a head 100 which is carried by an operating stem 102 threaded into the side wall of the bracket 96, so that its end may be grasped by a wrench outside the brake. The axis of the stem 102 is at right angles to the axis of the plungers 94. The opening in bracket 96 through which the operating member 100—102 is introduced may be closed by a suitable stamping 104.

The embodiment of Figure 2 differs from that of Figure 1 in that the axis of member 100—102 is at one side of the position of ball 98 when the brake is new, the bracket 196 being formed accordingly. This is to take care of the well-known fact that, especially in brakes for automobiles, the lining of the shoe which does the greater work in forward braking wears faster than the lining of the other shoe.

In both embodiments, the stem 102 can be turned to crowd the ball 98 between the converging surfaces on the plungers 94, to wedge the shoes apart.

In Figures 3 and 4, in addition to a cup-shaped guide stamping 106 cut away to embrace the plungers 94, the head 200 of stem 102 is formed with radial rounded ribs yieldingly interlocking (under the pull of the brake return springs connecting the shoes) with corresponding grooves in a non-circular member 208 which provides on its other face a plane surface which is engaged by the ball 98. This forms a convenient means for yieldingly locking the adjustment.

While several embodiments have been described in detail, it is not my intention to limit the scope of the invention to those particular embodiments, or otherwise than by the terms of the appended claim.

I claim:

A brake having shoes provided with a shiftable connection including a pair of endwise-movable plungers arranged end to end and engaging the shoes respectively, stationary means embracing and guiding said plungers, the adjacent faces of the plungers having converging wedge faces, a ball engaging said faces, and a thrust member mounted in the stationary member and adjustable in a direction paralleling the brake axis and with which the ball has rolling contact and which is operable to force the ball between said faces to wedge the plungers apart to adjust the shoes for wear.

RUDOLPH A. GOEPFRICH.